United States Patent [19]

Shelander

[11] Patent Number: 4,899,048
[45] Date of Patent: Feb. 6, 1990

[54] FOCUSED OPTICAL BEAM ENCODER OF POSITION

[75] Inventor: David J. Shelander, St. Paul, Minn.

[73] Assignee: Printware, Inc., Saint Paul, Minn.

[21] Appl. No.: 43,167

[22] Filed: Apr. 27, 1987

[51] Int. Cl.[4] .............................. G01D 5/34; H01J 3/14
[52] U.S. Cl. .......................... 250/231 SE; 250/237 G
[58] Field of Search ..................... 250/237 G, 231 SE; 340/347 P; 356/395; 350/162.17

[56] References Cited

U.S. PATENT DOCUMENTS

| | | |
|---|---|---|
| 3,781,110 | 12/1973 | Leitz et al. ...................... 250/237 G |
| 3,856,400 | 12/1974 | Hartmann et al. ............. 250/237 G |
| 3,879,136 | 4/1975 | Takeda .......................... 250/231 SE |
| 3,963,351 | 6/1976 | Chance et al. ................ 250/231 SE |
| 3,972,021 | 7/1976 | Leitz et al. ..................... 250/237 G |
| 4,020,912 | 5/1977 | Hino et al. ..................... 250/231 SE |
| 4,074,258 | 2/1978 | Doré et al. ....................... 340/347 P |
| 4,373,816 | 2/1983 | Laib ................................ 250/237 G |
| 4,384,204 | 5/1983 | Tamaki .......................... 250/231 SE |

*Primary Examiner*—David C. Nelms
*Assistant Examiner*—William L. Oen
*Attorney, Agent, or Firm*—Dressler, Goldsmith

[57] ABSTRACT

A light beam, typically 780 nanometer coherent light generated by a laser diode, is focused, preferably by a wide angle graded index optics lens having a numerical aperture of 0.46 and a diameter of 1.8 mm, into a diffraction limited spot, of approximate diameter 0.039 to 0.3 mils, upon an encoder wheel. The encoder wheel is typically a photoetched radial reticular grating on Mylar ® plastic having lines at 0.00025" width at a radius of 1". The focused light beam intercepts the encoder wheel at this 1" radius and is alternately transmitted and obstructed by the reticular grating of the rotating encoder wheel. The selectivity transmitted light beam is received at a detector, typically a phototransistor. Greater than 10,000 transitions per encoder wheel revolution are detectable.

25 Claims, 2 Drawing Sheets

COLLIMATED OPTICAL BEAM
PHOTOTRANSISTOR
L.E.D.
ENCODER WHEEL

ENCODER WHEEL
COLLIMATED OPTICAL BEAM
PHOTOTRANSISTOR
L.E.D.
RETICLE

ENCODER WHEEL
PHOTOTRANSISTOR
LASER DIODE
FOCUSING LENS
DIFFRACTION LIMITED SPOT

FOCUSED OPTICAL BEAM ENCODER OF POSITION

BACKGROUND OF THE INVENTION

1. Field of the Invention

The present invention generally relates to high resolution linear or rotary encoders used for determination of position and/or time derivatives of position. The present invention particularly relates to optical encoders of position.

2. Description of the Relevant Art

Encoders of position transform a physical position into an electrical signal corresponding to such position. Encoders of position which are optical employ a source of light, a detector of light from such source, and a grating which positionally moves relative to the path of light between the source and the detector in order, by such movement, to selectively interrupt the light path between the source and the detector. The optical path may be either through the grating or reflected from the grating. The position being encoded may either be angular (rotary) or linear. The position may be simultaneously encoded on either single or multiple channels of encoding. The absolute position relative to some predetermined reference position may be encoded, or only the incremental positional changes may be encoded. Most positional encoding is, however, of the incremental type wherein an alternating electrical signal is produced with successive incremental positional movements, each detectable increment of position producing one phase change of the electrical signal.

The general fields of application for positional encoders, and particularly for optical position encoders, are diverse. They include inspections, measurements, and metrology; factory automation including machine tools, robotics, and assembly machinery; semiconductor processing equipment; medical therapeutic and diagnostic equipments; and computer peripherals including printers and disk drives. Specific applications include Coordinate Measuring Machines (CMM), Flexible Machining Centers (FMC), X-Y stages, Servo systems, rotary indexing tables, component insertion machines, photomask inspection machines, medical ultrasound systems, tape drives, printers, plotters, microfiche readers, and phototypesetters.

An incremental optical positional encoder is simple in concept. It normally consists of four components. First there is a source of light, which source is normally either incandescent or a Light Emitting Diode (LED). In the optical transmission path is an assembly, normally an encoder strip for a linear encoder or an encoder wheel for a rotary optical encoder, which presents a pattern of alternating opaque and translucent segments. The light passing through (or reflected from) such segments is alternately transmitted and blocked (or, alternatively, reflected or absorbed) causing a light sensor, which is usually a phototransistor, to detect a light and dark modulation in the light beam. Finally, electrical signal conditioning circuitry is used to format the electrical signal generated by the light sensor (phototransistor) into usable information. The beam from a small light source, normally an L.E.D., which is collimated in an elementary optical encoder of this nature will normally have a positional resolution on the order of 10+ lines per inch.

Attempts to extend this elementary concept of optical position encoders to high positional resolution levels within reasonably sized packages rapidly result in considerably increased design sophistication, and greatly increased cost on the order of hundreds of dollars per each high resolution optical encoder assembly. Particularly in order to obtain increased resolution in an optical position encoder (i) the light source is collimated and (ii) an additional element called a mask, or reticle, is added between the optical disk and the sensor. This mask, or reticle, produces a shuttering effect so that only when the translucent segments of both the encoder disk and the reticle are in alignment is light then permitted to pass in the path between the light source and the light sensor. Optical encoders employing both collimated optical beams and masks, or reticles, can typically resolve on the order of 144+ lines per inch.

This improved level of resolution, and even that somewhat greater level of resolution attained by the very best prior art optical encoders which are of reasonable size (and which will shortly be specifically discussed), is very often inadequate in modern applications. For example, an important specification of robot performance and productivity is its acceleration/deceleration times. However, there is no good measurement standard to mathematically describe overshoot and settling times resultant from acceleration and deceleration of a robot arm. Despite the lack of quantification, the robot movement process is clearly visible. When a robot arm approaches a designated point that requires maximun repeatability under full payload, it is all too likely to exhibit an overshoot or settling time problem which causes it to do a "rain dance", jerking every which way. Another robot specification which correlates with the existence of these problems is encoder shaft pulses per second, or resolution. The more pulses per second generated by the encoder shaft at full speed, the more precise the possible control of the robot arm and the less likelihood of overshoot and/or settling time problems which, in the extreme case, result in crashes and damaged parts.

Even when the positional encoder rate in pulses per second is very high, or even maximal, by the standards of the prior art, it should be recognized that electronic circuits which are carefully designed to apply time constants reflective of mechanical settling times are required to effect even approximately smooth movement. This is true even though the electronic circuits controlling mechanical motion may be many hundreds, and even thousands, of times faster-responding than the mechanical systems which are controlled in motion. Why then cannot electronic control of position be simplistically based on mere brute force positional feedback loop computation and resultant control?. The answer is simply that, in the past, the electronics needed to be sophisticated to effect control based on inadequately precise and inadequately timely positional information. The electronics must constantly extrapolate from imprecise and untimely information to predict where the mechanical system really is, and will be. It is generally insufficiently accurate and/or timely positional information, and not any intrinsic limitation of electronic control of mechanical motion, which imparts the jerkiness to robot motion which is so cleverly and amusingly satirized in a human pantomine of such robot motion.

The present invention is intended, amongst other purposes, to render obsolete the stereotypical notion of jerky and spasmodic robot motion. It does so by providing low cost positional sensing of such high resolution that even quite crude electronic positional control circuits will suffice, in combination with improved positional encoders in accordance with the present invention, to so continuously apply accurate drive stimulus to mechanical motion so as to make such motion appear, in relation to the human senses, to be fluid and graceful. In other words, if position, and the first time derivative of position or velocity, and the second time derivative of position or acceleration, may all be readily known with astounding accuracy and time currency, then the most rudimentary equations relating actual future position to desired future position may be used to effect control of the motion of mechanical systems. Before positional encoders in accordance with the present invention are taught, however, it is useful to further consider specific prior art optical encoders of high performance.

Representative highest-performing prior art optical rotary position encoders include the following. The Encoder Division of Dynamics Research Corporation offers in their Module 25 encoder a disk which can be provided with up to 3,000 lines, providing a maximun of 3,000 cycles per shaft revolution (exclusive of either internal or external cycle interpolation) in a 2.5 inch diameter package. The K3 series modular optical encoder from the Instrument Division of Dresser Industries is capable of up to 2500 cycles per revolution resolution in a 2.1 inch diameter case. Finally, the HEDS-6000 series of incremental optical encoders from Hewlett Packard offers resolution of up to 1024 cycles per revolution in a 2.2 inch diameter case. The number of lines, or transitions, which are being resolved per inch in these encoders may be readily estimated from the fact that the circumference of a circle is pi times its diameter.

All the prior art high resolution high optical encoders are very difficult and exacting of assembly, which contributes greatly to their cost. For example, the aforementioned HEDS-6000 series is available as a user-assemblable optical encoder kit. The number of major assembly steps is 8, each consisting of an average of 4 seperate substeps. Although in high volume applications using custom design tooling and automated equipments it is predicted by the manufacturer that encoder assembly can be accomplished in less than 30 seconds, assembly by more conventional manual means is a demanding task of many minutes which is normally performed by skilled technicians or assemblers.

The difficulties, time demands, and resultant high cost of assembling high-resolution optical encoder assemblies stems from their basic and uneliminatable requirement for exacting mechanical and optical parts which must be aligned with great precision. Consider, for example, the sensitivity of a rotary optical encoder to motor shaft runout and woble. Motor shaft runout means that the optical encoder disk may be eccentric on its axis of rotation. This means that the alternating opaque and translucent segments, as detected at the radius of the encoder disk whereat it intercepts the light path, will not be of equal width in different sectors around the circumference of the optical disk. Unequal widths translate into unequal detected light energy, and unequal electrical signals resultant from such detection, for equal motion. Obviously positional resolution, and accuracy, is affected when the transition of the electrical signal may be a function of which sector of an eccentric encoder disk is being read as well as the motion and position of the encoder disk.

Probably more important than motor shaft runout, which to some degree can be overcome with electrical signal shaping circuitry, is the problem of wobble, or that the plane of the disk may not be precisely perpendicular in all sectors thereof to the path of light through such encoded disk. If the alternating opaque and translucent segments on the disk are at a slight angle to the path of light intercepting such segments, than it should be envisioned that these segments, being of finite thickness, will intercept the light beam in a manner which causes more of a step function, or even a sine wave, in the light intensity detected at the light sensor as opposed to an on-off square wave of received light intensity. Thus, when the alternating segments, which are extremely narrow, are at a sufficient angle to the impingent light beam, then no modulation will be obtained at all, with the leading edge of one opaque segment overlapping the trailing edge of a predecessor opaque segment. In order to reduce this problem, the optical encoder disk may be made extremely thin. If it is thin and flexible then it may exhibit warp or systemic deformation, reintroducing wobble. If it is extremely thin and rigid then it may be readily subject to mechanical damage, especially from shock.

Problems experienced with the demanding mechanical components, and alignment, of high resolution optical positional encoders are analogous to those experienced in phonographic reproduction of sound, in magnetic recording of disks, and in optical recording of disks. In order to obtain resolution performance at or near the limits of the prior art technology optical encoders, which limits are on the order of several hundred lines per inch resolution, cosiderable penalties may have to be paid in reliability, immunity to vibration and/or mechanical shock and/or temperature variation, and especially in cost. For these reasons, the present invention is embodied in a new apparatus for highest resolution optical position encoding which apparatus is both easy and low cost of assembly, and rugged and reliable in operation.

SUMMARY OF THE INVENTION

The present invention is an improvement to the apparatus of an optical position encoder having a source of light, a detector of light from such source, and a grating which moves relative to the path of light between the source and the detector in order, by such movement, to selectively interrupt the light path between the source and detector in a manner which may be detected by the detector. For a light path which is through the grating, as opposed to being reflected from the grating, the grating presents a pattern of alternating opaque and translucent segments. For the case of a rotary optical encoder encoding angular position, the grating is an encoded disk, or wheel.

The improvement in accordance with the present invention is to convergently focus the light from the source of light onto the grating. The detector of light, nominally a phototransistor, is placed sufficiently close to the grating along the light path, and in the opposite direction along such path from the source of light and the focusing assembly, so that substantial of the light which has been focused onto the plane of the grading is intercepted.

It is particularly desired, and realized in the preferred embodiment of the invention, that the focusing of the source of light should be to a principal focus at the approximate size of a diffraction limited spot upon the plane of the grating. Although this can be realized with normal glass lenses, it normally requires multiple lens elements of high cost.

Correspondingly, the preferred embodiment method apparatus of the present invention uses a source of coherent light, nominally obtained from a low cost laser diode, which is focused into a diffraction limited spot by a graded index optics lens, also of low cost. A graded index optics lens is a lens in which the index of refraction is varied by changes in the optical index of the material of the lens obtained by doping of this material, nominally with thallium. The graded index optics lens which is particularly preferred for use in the apparatus of the present invention exhibits an index of refraction which decreases as the square of the radial distance from the optical axis. This graded index optics lens performs the same optical function as standard spherical lenses with the added feature that the end surfaces are flat and that the lens is of low cost.

The preferred detector within the apparatus embodying the invention is simply a readily available phototransistor. At the preferred optical wavelength (approximately 780 nanometers) generated by the laser diode, a certain preferred wide angle graded index lens having a numerical aperture of approximately 0.46 and a diameter of approximately 1.8 millimeters is used to focus a diffraction limited spot on the plane of an encoder wheel. The diameter d of the diffraction limited spot is defined by optical theory as $d \approx 4\lambda f/\pi D$ wherein $\lambda$=wavelength, f=focal length, and D=beam diameter. At the preferred configuration of the apparatus of the present invention, the diameter d of this diffraction limited spot at the $1/E^2$ power points will be on the order of 0.039 to 0.3 mils.

Thus the typical resolution obtainable by the method and apparatus of the present invention is greater than 2500 lines per inch, or greater than 10,000 transitions detectable on a photoetched radial reticular grating on mylar ® plastic exhibiting lines at 2.5 ten-thousandths line width when this grating is intercepted at a 1" radius by a focused light beam. This level of resolution is obtainable by an apparatus constructed in accordance with the present invention without high precision alignment of components, and without any high sensitivity of the apparatus so assembled to temperature, shock, vibration or other physical variables. The preferred embodiment apparatus costs less than approximately $30 to build, including assembly labor. The present invention may be directly further extended to the theoretical limits of optical performance based upon the smallest dimensions which can be optically resolved. If the inexpensive graded index optics lens is used, it typically has a cut-off wavelength as short as 0.380 micrometers.

DESCRIPTION OF THE PREFERRED EMBODIMENT

The present invention is an improvement to the method of optically encoding position, and to an apparatus for so optically encoding position. The position encoded may be either linear or angular. The time derivatives of the encoded position, i.e., velocity and acceleration, may be derived from the encoded position by conventional means including electronic circuitry.

Figure 1:
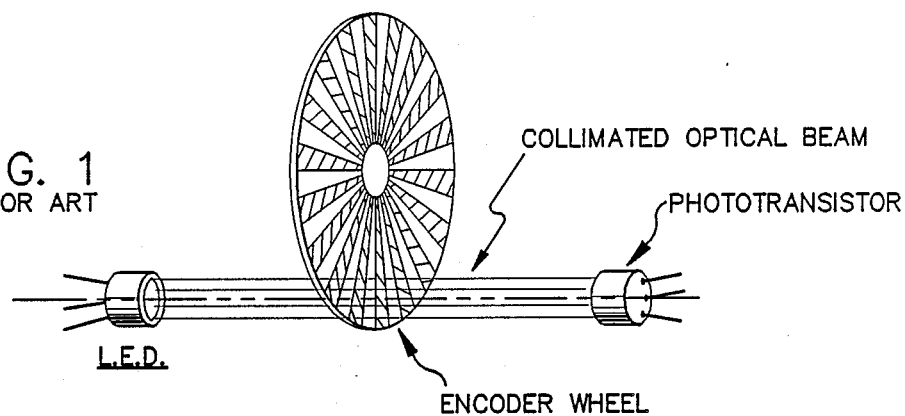
FIG. 1 is a diagramatic representation showing a first prior art rotary optical encoder.

A first, rudimentary, prior art apparatus for optical encoding of rotary, angular, position is diagramatically shown in FIG. 1. This optical encoder employs a light source, nominally a Light Emitting Diode, or L.E.D. The light emitted by such L.E.D. is formed into COLLIMATED OPTICAL BEAM, either by the L.E.D. itself or by the use of standard optical elements (not shown), and transmitted in an optical path to an optical detector, nominally a PHOTOTRANSISTOR. An optical grading, herein for the detection of rotary position, in the form of an ENCODER WHEEL presents a pattern of alternating opaque and translucent segments between the L.E.D. light source and the detector PHOTOTRANSISTOR. When the ENCODER WHEEL moves angularly, such as in response to rotation of a shaft (not shown) to which it is affixed, then the light detector PHOTOTRANSISTOR will detect light and dark modulation in the received light beam, producing an output electrical signal which varies in level. Electrical circuitry (not shown) receives this output electrical signal, conditions it, and formats it into usable information representative of the angular position of the ENCODER WHEEL. The resolution of position so optically encoded is a function of the size of the COLLIMATED OPTICAL BEAM, and of the alignment of the components. Typically for the apparatus diagramatically illustrated in FIG. 1 the positional resolution on the order of 10+ lines per inch. The angle which can be resolved depends on the radius of the ENCODER WHEEL.

Figure 2:
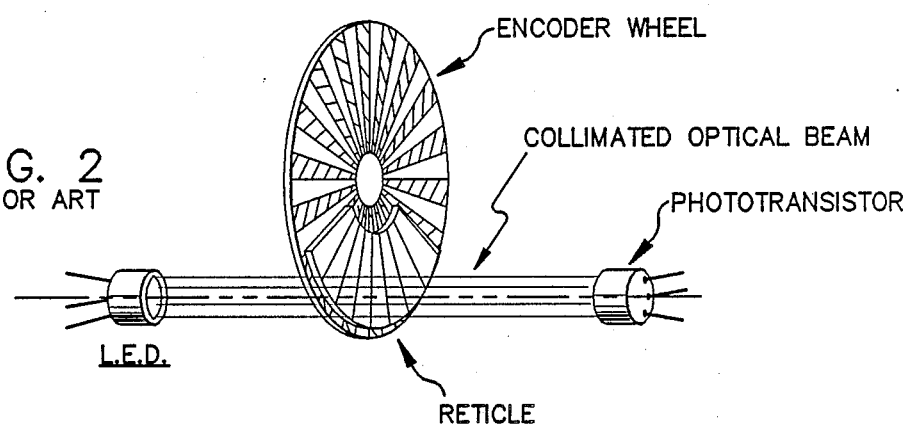
FIG. 2 is a diagramatic representation showing a second prior art rotary optical encoder employing a reticle.

A second prior art optical encoder apparatus is diagramatically shown in FIG. 2. In order to obtain increased positional resolution, the light source originating at the L.E.D. is again formed into a COLLIMATED OPTICAL BEAM and is passed through the ENCODER WHEEL plus the additional element of the RETICLE, or mask. The RETICLE is added between the ENCODER WHEEL and the optical detector PHOTOTRANSISTOR in order to produce a shuttering effect. By operation of this shuttering effect light is permitted to pass from the L.E.D. to the PHOTOTRANSISTOR only when the translucent segments of both the ENCODER WHEEL and the RETICLE are in alignment. Since two translucent segments, or slits, must be lined up in order to allow completion of the optical transmission path, each segment may be individually narrower than the COLLIMATED OPTICAL BEAM. By such a technique, as illustrated in the prior art apparatus shown in FIG. 2, a resolution which is typically on the order of 144+ lines per inch may be obtained.

Both the prior art apparatus shown in FIG. 1 and that shown in FIG. 2 are susceptible to eccentricity of the ENCODER WHEEL about its axis of rotation, also to any wobble of the ENCODER WHEEL in the plane perpendicular to the COLLIMATED OPTICAL BEAM, and also to any systemic misalignment of components. Particularly, it may be imagined what effect is derived if the plane of the ENCODER WHEEL is not precisely prependicular to the path of the COLLIMATED OPTICAL BEAM—either because of wobble in the ENCODER WHEEL or because of misalignment resulting in a constant tilt of the ENCODER WHEEL. In such a case, the alternating dark and light segments upon the ENCODER WHEEL will not intercept the COLLIMATED OPTICAL BEAM with sharp edges. Rather, such alternating opaque and translucent segments will only progressively obscure, and then progressively enable, transmission of the COLLIMATED OPTICAL BEAM. This progressive obscuration and unveiling causes that the light intensity at the light-detecting PHOTOTRANSISTOR, and the electrical signal developed from such PHOTOTRANSISTOR, will not be a perfect on/off function (an electrical square wave), but will rather be a progressive function (an electrical step or continuous wave) which will gradually deteriorate into a gray (black) or d.c. level indicative of a constantly blocked light path. Because of such sensitivity to the orthogonality between the COLLIMATED OPTICAL BEAM and the ENCODER WHEEL (and RETICLE), those PRIOR ART apparatus diagrammatically illustrated in FIG. 1 and FIG. 2 require precise initial alignment, and operational maintenance of such precise alignment. The method and apparatus of the present invention will be considerably simpler of initial alignment, and considerably more insensitive to any variation in this alignment, than are the prior art apparatus.

Figure 3:
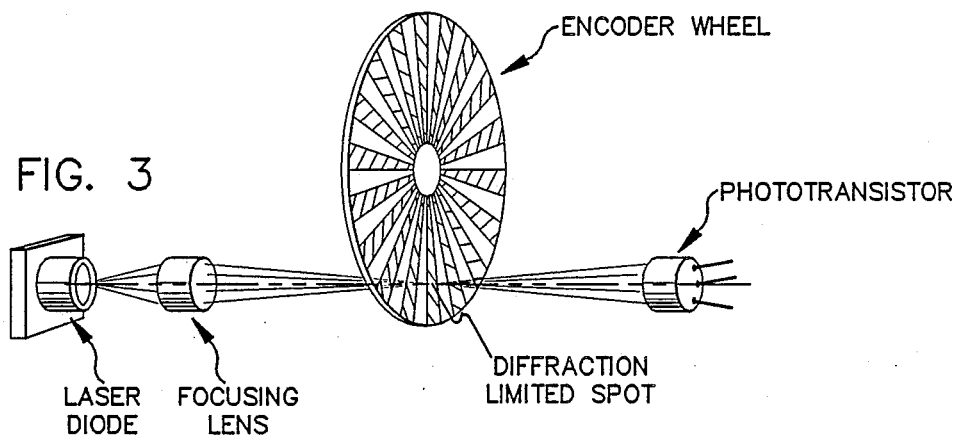
FIG. 3 is a diagramatic representation of the optical position encoder apparatus of the present invention in an embodiment for detecting angular position.

A basic embodiment of an apparatus in accordance with the present invention is diagrammatically illustrated in FIG. 3. The fundamental addition to the prior art optical encoder shown in FIG. 1 is the FOCUSING LENS. The FOCUSING LENS convergently focuses light received from the light source, nominally the LASER DIODE, onto the plane of the ENCODER WHEEL. The focused light beam diverges after passing through the ENCODER WHEEL, and is substantially intercepted by the detector, nominally a PHOTOTRANSISTOR. Obviously the focused light beam intersects the ENCODER WHEEL at a smaller diameter spot at or near the principal focus, and thusly enables higher resolution, than is obtainable within prior art apparatus of equivalent dimension. At the threshold of considering the present invention it must be candidly admitted that if only a conventional glass focusing lens, without more and without any different means for focusing than is presented by such a conventional glass lens, is added to an apparatus of the prior art, then more problems may have been added than have been solved. Addition of the focusing element in the form of a glass lens(es), while totally effective to accomplish the present invention, is liable to be very expensive.

Consequently the principles of the present invention are best implemented in a more sophisticated form than a somewhat simplistic (in execution, not in concept) addition of a FOCUSING LENS to the prior art apparatus. Particularly, the basic embodiment of the apparatus of the present invention shown in FIG. 3 needs not use a coherent light source, but is suggested to do so in the form of a LASER DIODE light source. When the light is coherent, then the FOCUSING LENS can focus such to the smallest spot which is possible within optical diffraction theory. This spot is called a DIFFRACTION LIMITED SPOT and it is this preferred spot which is shown to be focused on the plane of the ENCODER WHEEL in FIG. 3. The size of the DIFFRACTION LIMITED SPOT is dependent upon the wavelength of the light focused, the focal length of the FOCUSING LENS, and the diameter of the light beam which is focused by the lens. This dependency is expressed in the formula:

$$d = 4\lambda f / \pi D$$

wherein d is the diameter of the DIFFRACTION LIMITED SPOT in microns measured at the $1/E^2$ power points, wherein $\lambda$ is the wavelength of the focused light in microns, wherein f is the focal length in millimeters of the FOCUSING LENS, and wherein D is the diameter of the focused light beam in millimeters at the $1/E^2$ power points.

Furthermore, the FOCUSING LENS accomplishing optical focusing even to the minute size of the preferred DIFFRACTION LIMITED SPOT may be made from glass. However, if the FOCUSING LENS is so made from glass then it will normally be required to be of multiple lens elements exhibiting extreme high precision in order to obtain focusing to such a minute size—the theoretical limit of optical focusing performance. In the preferred embodiment apparatus of the present invention, the FOCUSING LENS is not a conventional glass lens. It is preferably a relatively new development in optics called a GRADED INDEX OPTICS LENS.

Graded index optics is a relatively new process for obtaining light bending, including focusing, from optical materials in which the index of refraction is altered by a doping of the material. In particular, a GRADED INDEX OPTICS LENS is an optical component in which the index of refraction changes as a function of the radius about the axis of the lens material. Even more particularly, one particular GRADED INDEX OPTICS LENS called the SELFOC® (trademarks of Nippon Sheet Glass Company). Micro Lens (SML) available from Nippon Sheet Glass Company, Limited is a cylindrical lens with an index of refraction which decreases as the square of the radial distance from the optical axis (which is also the axis of the cylinder). Particularly, the index of refraction $n = n_o(1 - Ar^2/2)$ wherein $n_o$ and A are constants. Because of this parabolic index of refraction, the SML performs the same optical function as standard spherical lenses with the added feature that the end surfaces of the SML are flat. Such an SML is small and lightweight, offers simplified mounting and alignment, is available with adjustable focal lengths, and is extremely inexpensive in comparison to the glass lenses which it replaces. GRADED INDEX OPTICS LENSES, including the SML, are formed by thallium doping of an optical material followed by cleaving and polishing of the cylindrical ends. These graded index optics lenses are obtaining wide application in fiber optics, where they have a function to couple light to and from optical fibers.

Figure 4A:
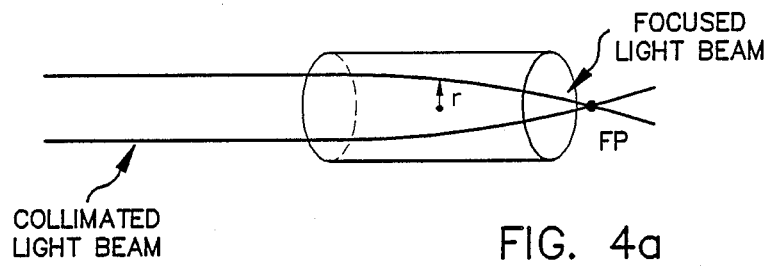
FIG. 4, consisting of FIG. 4a and FIG. 4b, is a diagramatic representation of prior art graded optical index lenses respectively employed in beam reduction (contraction) and in coupling optical applications.
Figure 4B:
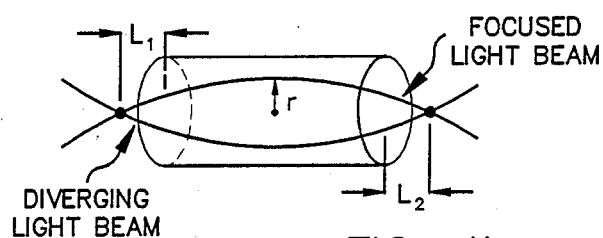

The two particular prior art GRADED INDEX OPTICS LENS, which are particularly two SELFOC Micro Lens (SML), which are preferred for use in the apparatus of the present invention are illustrated in FIG. 4, consisting of FIG. 4a and FIG. 4b. The SML illustrated in FIG. 4a is in a configuration for optical beam reduction, or contraction. Such a GRADED INDEX OPTICS LENS is obtainable as the type 0.23

Pitch SML. This 0.23 pitch SML is designed so that its focal point, or FP, is always outside the lens when a collimated (0.63 micrometers to 1.56 micrometers wavelength range) beam is projected on the incident end surface. This 0.23 pitch SML is typically used to change a diverging beam from a fiber or from a laser diode into a collimated beam. It is employed in the apparatus of the present invention to take a COLLIMATED LIGHT BEAM developed from a laser diode or other source and to focus such COLLIMATED LIGHT BEAM into a focal point (FP) at the plane of an ENCODER WHEEL.

A second prior art preferred SML for use in the apparatus in the present invention is illustrated in FIG. 4b. This SML is available as a 0.29 Pitch lens which is used to change diverging beam from a laser diode into a converging beam. It is normally so used for coupling a laser diode to an optical fiber, or the light output of an optical fiber to a detector. It is used in the apparatus of the present invention to change a diverging beam originating at a SEMICONDUCTOR LASER into a converging beam focused to a DIFFRACTION LIMITED SPOT as the plane of an ENCODER WHEEL.

Figure 5:
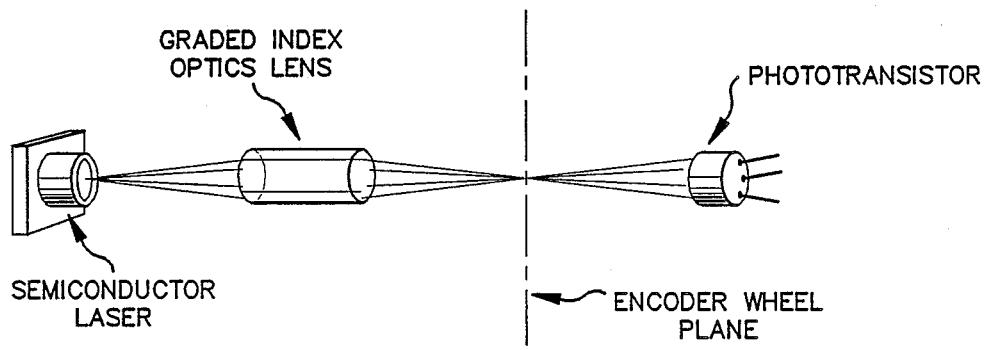
FIG. 5 shows a further diagramatic view of a preferred embodiment apparatus of the present invention for rotary optical position encoding, particularly as preferably employing a graded index optics lens.

A preferred embodiment implementation of the apparatus of the present invention which particularly employs a GRADED INDEX OPTICS LENS is shown in FIG. 5. The SEMICONDUCTOR LASER is a source of coherent light in the range which can be focused by the GRADED INDEX OPTICS LENS and detected by the PHOTOTRANSISTOR. The SEMICONDUCTOR LASER is nominally a Mitsubishi p/n 4102 or Hitachi p/n 7801E each having an approximate wavelength of 780 nanometers and a power consumption of 3 millowatts. The GRADED INDEX OPTICS LENS is normally a SELFOC ® Micro Lens (SML) of the 0.29 Pitch type which was previously illustrated in FIG. 4b. Particularly, this 0.29 Pitch SML is a Type SLW which is a wide angle device available from Nippon Sheet Glass Company, Ltd. This Type SLW SML has a numerical aperture of 0.46 and a cut-off wavelength of approximately 0.380 micrometers. It is approximately 0.060 inches in diameter and 0.18 inches long. In the apparatus of the present invention the front surface of the GRADED INDEX OPTICS LENS is emplaced at a critical dimension of $0.020 \pm 0.002$ inches from the SEMICONDUCTOR LASER, and will form a DIFFRACTION LIMITED SPOT at a critical distance of $0.157 \pm 0.002$ inches from the rear surface of the GRADED INDEX OPTICS LENS whereat is located the ENCODER WHEEL PLANE. The detector is a simple PHOTOTRANSISTOR disposed on the other side of the ENCODER WHEEL PLANE at a distance whereat it can intercept substantially all of the radiation within the light beam which has been focused onto the ENCODER WHEEL PLANE. This distance is nominally made symmetrical with the separation of GRADED INDEX OPTICS LENS from the ENCODER WHEEL PLANE, or approximately 0.157 inches. The PHOTOTRANSISTOR may be any of the standard types which are all generally sensitive to 700 nanometers light, including types available from Mitsubishi, TRW, and Tandy Radio Shack amongst other suppliers.

None of the dimensions or alignments within the preferred embodiment apparatus of the present invention shown in FIG. 5 are especially critical. The most important dimensions are the separation of the SEMICONDUCTOR LASER from a first end plane of the GRADED INDEX OPTICS LENS, and the separation of the ENCODER WHEEL PLANE from the second end plane of such GRADED INDEX OPTICS LENS. Both of these dimensions are preferably both accurate and fixed within $\pm 0.002$ inches. The angular tolerance of the GRADED INDEX OPTICS LENS through the ENCODER WHEEL to the PHOTOTRANSISTOR IS PREFERABLY WITHIN $\pm 4.0$ degrees. Likewise, the GRADED INDEX OPTICS LENS is also preferably coaxial to the PHOTOTRANSISTOR at $\pm 0.020$ inches. These readily achievable tolerances result in a depth of focus at the plane of the ENCODER WHEEL which is approximately $\pm 0.005$ inches. In other words, a spot very close to the size of the DIFFRACTION LIMITED SPOT can be readily attained at the plane of the ENCODER WHEEL by a most elementary setup procedure of simply moving the components into proximity and visually or electronically observing the results. Thereafter these results are substantially maintained even in the presence of such shock, vibration, or temperature variations which do cause slight alterations in the separation of components. As may be envisioned, since the focus at the ENCODER WHEEL PLANE is at, or near, the size of a DIFFRACTION LIMITED SPOT, it does not significantly matter if such ENCODER PLANE is not perfectly orthogonal to the axis of the optical beam, or exhibits wobble or eccentricity during rotation.

The performance level easily obtainable, and maintainable, with the preferred embodiment apparatus of the present invention shown in FIG. 5 is a resolution in excess of 2500 lines per inch. Particularly, a ENCODER WHEEL is prepared as a photo etched radial reticular grating on MYLAR ® plastic (trademark of E. I. DuPont de Nemours and Company) or glass with radial lines at 2.5 ten-thousandths inch line width. The ENCODER WHEEL has a 1.25 inch radius (2.5 inch diameter) and is intercepted by the light beam at a 1 inch radius. At this radius over 10,000 line transitions are reliably resolved. The apparatus of the present invention is eventually capable of performance at the theoretically limited level which is determined by the size of the DIFFRACTION LIMITED SPOT. The ability to create such a DIFFRACTION LIMITED SPOT in the apparatus of the present invention should be compared to optical disk technology, and to the packing density obtainable on optical recording disks. Resolution of several thousand lines per inch in optical position encoders is expected to be readily feasible.

The cost of one preferred embodiment apparatus of the present invention at quantities of 1000 is approximately $28.23. This is derived as $6.40 for a laser diode Hitachi type HL-7801E, $5.00 for a graded index lens NSG type W18-025-083, $2.00 for a mechanical housing including the disk of custom construction, $1.00 for a phototransistor Motorola type MRB630, $2.50 for shaft bearings SKF type W-0.625, $8.00 for an electronics and power supply board of custom construction, and approximately $\frac{1}{4}$ hour assembly labor at $10.00 per hour.

In accordance with the preceding discussion, the present invention should be recognized to show the focusing of the light path within an optical position encoder, and particularly the focusing of coherent light with a GRADED INDEX OPTICS LENS to obtain resolution at the limit of a DIFFRACTION LIMITED SPOT which is focused upon an ENCODER WHEEL. Correspondingly, the present invention should be interpreted in accordance with the following claims, only, and not merely in accordance with those particular embodiments within which the invention has been taught.

What is claimed is:

1. In an optical position encoder having a source of light, a detector of light from the source of light, and a grating which moves relative to a path of light between the source and the detector in order to, by such movement, selectively interrupt the light path between source and detector so that the motion of the grating may be detected by these interruptions, an improvement comprising:
   a focusing means between the source of light and the grating for convergently focusing the light from the source of light onto the grating.

2. The improvement to an optical position encoder according to claim 1 wherein the focusing means is focusing the source of light into a diffraction limited spot at the grating.

3. The improvement to an optical position encoder according to claim 1 wherein the focusing means comprises:
   a lens with an index of refraction which decreases as the square of the radial distance from an optical axis of the lens.

4. The improvement to an optical position encoder according to claim 1 wherein the focusing means comprises:
   a graded index optics lens.

5. The improvement to an optical position encoder according to claim 1 wherein the source of light comprises:
   a source of coherent light.

6. The improvement to an optical position encoder according to claim 5 wherein the source of light comprises:
   a semiconductor laser diode.

7. The improvement according to claim 1 wherein the detector of light comprises:
   a phototransistor.

8. The improvement according to claim 1 wherein the grating is an optically encoded disk, and wherein the focusing means is focusing light onto the plane of the disk.

9. In an optical encoder of angular position having
   a light source,
   a light sensor, and
   an encoder wheel positioned between the light source and light sensor and presenting a pattern of alternating segments which, with angular positional movement of the encoder wheel, alternately enable and disable a light path between the light source and the light sensor and make the light sensor detect the angular positional movement of the encoder wheel, an improvement comprising:
   a lens convergently focusing light from the source of light onto the plane of the encoder wheel.

10. The improvement to an optical encoder of angular position according to claim 9 wherein the lens further comprises:
    a graded index optics lens.

11. The improvement to an optical encoder of angular position according to claim 9 wherein the lens is focusing light to a diffraction limited spot at the plane of the decoder wheel.

12. An improved method of optically encoding positional information by interrupting an optical beam between a source of light and a light sensor with and by a grating having a pattern of segments alternately enabling and disabling communication of light between the source and the sensor dependent upon the position of the grating relative thereto so that detection of the interruptions of the optical beam by the sensor is indicative of position of the grating, the improved method comprising:
    convergently focusing the light onto the grating.

13. The improved method for optically encoding positional information according to claim 12 wherein the focusing of light is of coherent light into a diffraction limited spot on the grating.

14. The improved method of optically encoding positional information according to claim 12 wherein the focusing is by a lens.

15. The improved method of optically encoding positional information according to claim 14 wherein the focusing is by a lens with an index of refraction which decreases as the square of the distance from the optical axis.

16. The improved method of optically encoding positional information according to claim 14 wherein the focusing is by a graded index optics lens.

17. The improved method of optically encoding positional information according to claim 12
    wherein the source of light is a source of coherent light;
    wherein the grating is an optically encoded disk having alternate opaque and translucent segments;
    wherein the communication of light between the source and the sensor is through the disk; and
    wherein the focusing is onto the grating of the plane of the disk at a focal point diameter which is within two times of the diffraction limited diameter equalling 4 f/D wherein=the wavelength of the coherent light, f=the focal length of the focusing, and D=the diameter of the coherent light beam which is intercepted for focusing.

18. A method of aligning components of an optical position encoder in order that an optical disk bearing greater than 1000 reticule lines per inch may be reliably resolved, the method comprising:
    defining the plane of an optical disk,
    locating, in a line orthogonal to the plane of the disk within plus or minus four degrees and intersecting the disk at a radius whereat greater than 1000 reticule lines per inch are present upon the disk, a semiconductor laser upon one side of the disk;
    locating, upon the line between the semiconductor laser and the disk, a graded index optic lens at (i) a distance from the semiconductor laser which intercepts substantial light and (ii) a distance from the disk so that a spot of size approximately the size of a diffraction limited spot is focused at the plane of the disk, ergo a spot of diameter $D=4\lambda f/\pi D$ wherein
    $\lambda$=wavelength of the semiconductor laser, while
    D=beam diameter intercepted by the graded index optic lens, and
    f=focal length of the graded index optic lens;
    adjusting $\lambda$, D, and f so that D is less than 1 mil; and
    locating the light sensor at a distance from the spot focus upon the disk so that substantial of the light passing through the spot is intercepted;
    whereby the light sensor is detecting light from the semiconductor laser which, by focusing action of the graded index optic lens, has intercepted the plane of the disk at a spot less than 1 mil diameter, of which spots there are greater than 1000/1=1000 in one inch;

whereby resolution of greater than 1000 reticule lines per inch on the optical disk may be reliably resolved.

19. In a machine tool, an encoder of position and/or time derivatives of position comprising:
   a source of light;
   a detector of light from the source of light;
   an optical grating which moves relative to a path of light between the source of light and the detector of light in order, by this movement, to selectively interrupt the light path between the source of light and the detector of light so that the movement of the grating is detected by the detector of light; and
   a lens for convergently focusing light from the source of light onto the optical grating.

20. In a robot, an encoder of position and/or time derivatives of position comprising:
   a source of light;
   a detector of light from the source of light;
   an optical grating which moves relative to a path of light between the source of light and the detector of light in order, by this movement, to selectively interrupt the light path between the source of light and the detector of light so that the movement of the grating is detected by the detector of light; and
   a lens for convergently focusing light from the source of light onto the optical grating.

21. In a computer peripheral, an encoder of position and/or time derivatives of position comprising:
   a source of light;
   a detector of light from the source of light;
   an optical grating which moves relative to a path of light between the source of light and the detector of light in order, by this movement, to selectively interrupt the light path between the source of light and the detector of light so that the movement of the grating is detected by the detector of light; and
   a lens for convergently focusing light from the source of light onto the optical grating.

22. In a machine variably positioning a workpiece, an encoder of the variable position at which the machine positions the workpiece comprising:
   a source of light;
   a detector of light from the source of light;
   an optical grating which moves relative to a path of light between the source of light and the detector of light in order, by this movement, to selectively interrupt the light path between the source of light and the detector of light so that the movement of the grating is detected by the detector of light; and
   a lens for convergently focusing light from the source of light onto the optical grating.

23. An optical encoder of angular position comprising:
   a light source,
   a light sensor, and
   an encoder wheel positioned between the light source and light sensor and presenting a pattern of alternating segments which, with angular positional movement of the encoder wheel, alternately enable and disable a light path between the light source and the light sensor and make the light sensor detect the angular positional movement of the encoder wheel; and
   a lens means for convergently focusing light from the source of light onto the plane of the encoder wheel.

24. An encoder of position and/or time derivatives of position comprising:
   a source of light;
   a detector of light from the source of light;
   an optical grating which moves relative to a path of light between the source of light and the detector of light in order, by this movement, to selectively interrupt the light path between the source of light and the detector of light so that the movement of the grating is detected by the detector of light; and
   focusing means for convergently focusing light from the source of light onto the optical grating.

25. An optical position encoder comprising:
   a source of light;
   a detector of light from the source of light;
   a grating which moves relative to a path of light between the source and the detector in order to, by such movement, selectively interrupt the light path between source and detector so that the motion of the grating may be detected by these interruptions; and
   a focusing means between the source of light and grating for convergently focusing the light from the source of light onto the grating.

* * * * *